(12) United States Patent
Salter et al.

(10) Patent No.: US 10,011,223 B1
(45) Date of Patent: Jul. 3, 2018

(54) VEHICLE ROTARY LAMP WITH VARIABLE INTENSITY

(71) Applicant: Ford Global Technologies, LLC, Dearborn, MI (US)

(72) Inventors: Stuart C. Salter, White Lake, MI (US); Diego Fabricio Villacres Mesias, San Mateo Atenco (MX); Paul Kenneth Dellock, Northville, MI (US); Mahesh Bhattacharyya, Novi, MI (US); Guillermo Cesar Cervantes Guarneros, Atizapan de Zaragoza (MX)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 15/494,855

(22) Filed: Apr. 24, 2017

(51) Int. Cl.
   *B60Q 1/44* (2006.01)
   *B60Q 3/82* (2017.01)
   *B60Q 3/217* (2017.01)

(52) U.S. Cl.
   CPC ............... *B60Q 3/82* (2017.02); *B60Q 3/217* (2017.02)

(58) Field of Classification Search
   CPC .................................. B60Q 3/82; B60Q 3/217
   See application file for complete search history.

(56) References Cited

U.S. PATENT DOCUMENTS

| 4,316,239 | A |  | 2/1982 | Cass et al. |
| 5,325,275 | A | * | 6/1994 | Liu ............................ B60Q 3/76 362/322 |
| 5,951,155 | A | * | 9/1999 | Lanser ................. H05B 39/044 362/295 |
| 6,858,835 | B2 |  | 2/2005 | Smith |
| 7,220,029 | B2 |  | 5/2007 | Bynum et al. |
| 7,249,873 | B2 |  | 7/2007 | Tiesler et al. |
| 7,261,450 | B2 |  | 8/2007 | Tiesler |
| 2012/0315985 | A1 | * | 12/2012 | Granger .............. G07F 17/3216 463/31 |
| 2015/0241196 | A1 | * | 8/2015 | Gerson .................. G01B 7/003 73/777 |
| 2016/0001700 | A1 | * | 1/2016 | Salter ....................... B60Q 1/56 362/510 |
| 2016/0023611 | A1 | * | 1/2016 | Huelke ..................... B60R 7/10 224/486 |
| 2016/0278184 | A1 | * | 9/2016 | Van De Sluis .... H05B 33/0854 |
| 2017/0267168 | A1 | * | 9/2017 | Dylewski, II ............ B60Q 3/30 |
| 2017/0290122 | A1 | * | 10/2017 | Gaborieau ........... B60Q 1/2607 |

FOREIGN PATENT DOCUMENTS

CN          205746078 U     11/2016

\* cited by examiner

*Primary Examiner* — Dedei K Hammond
*Assistant Examiner* — Raymond R Chai
(74) *Attorney, Agent, or Firm* — Vichit Chea; Price Heneveld LLP (57) ABSTRACT

A vehicle is provided that includes a liftgate, a trim panel located on an interior side of the liftgate, and a rotary lamp assembly assembled on the trim panel. The rotary lamp assembly includes a rotary bezel and a lamp supported on the bezel, wherein the lamp assembly is rotatable about at least one axis to redirect light output from the lamp.

14 Claims, 12 Drawing Sheets

VEHICLE ROTARY LAMP WITH VARIABLE INTENSITY

FIELD OF THE INVENTION

The present invention generally relates to vehicle lighting assemblies, and more particularly relates to a movable lamp assembly in a vehicle liftgate.

BACKGROUND OF THE INVENTION

Automotive utility vehicles such as sport utility vehicles (SUVs), hatchbacks, and minivans, are typically equipped with a pivoting door liftgate that moves between a downward closed position and an upward open position to allow access to the cargo area from the rear of the vehicle. The liftgate is often equipped with a static/fixed lamp assembly on the inside trim panel that may be activated to illuminate the cargo area generally forward of the liftgate. The fixed lamp assembly typically offers a very limited illumination range and may not fully illuminate the cargo area to the user's satisfaction. It would be desirable to provide for enhanced light illumination for such vehicles.

SUMMARY OF THE INVENTION

According to one aspect of the present invention, a light assembly is provided. The light assembly includes a lamp, a rotary bezel supporting the lamp, a sensor for sensing rotational position of the bezel, and a controller for controlling intensity of light emitted by the lamp based on the sensed rotational position of the bezel.

Embodiments of the first aspect of the invention can include any one or a combination of the following features:
- the sensor comprises a proximity sensor for sensing the rotational position of the bezel relative to a fixed supporting structure;
- the proximity sensor comprises a capacitive sensor;
- the capacitive sensor comprises at least one electrode provided on at least one of the bezel and the fixed supporting structure and a conductive structure provided on the other of the bezel and the fixed supporting structure, wherein the capacitive sensor generates a signal indicative of the position of the at least one electrode relative to the conductive structure;
- the light assembly is assembled on a vehicle;
- the vehicle light assembly is located on a liftgate of the vehicle;
- the vehicle light assembly is located on an interior surface of the liftgate;
- the vehicle light assembly is located on a trim panel on the liftgate;
- the light assembly illuminates an interior portion of a cargo area of the vehicle when the liftgate is open and is rotatable to illuminate an exterior portion of the vehicle; and
- the lamp comprises a light source and a lens.

According to another aspect of the present invention a vehicle light assembly is provided. The vehicle light assembly includes a lamp, a rotary bezel assembled on a vehicle and fixedly supporting the lamp, a sensor for sensing rotational position of the bezel, and a controller for controlling intensity of light emitted by the lamp based on the sensed rotational position of the bezel.

Embodiments of the second aspect of the invention can include any one or a combination of the following features:
- the sensor comprises a proximity sensor for sensing the rotational position of the bezel relative to a fixed supporting structure of the vehicle;
- the proximity sensor comprises capacitive sensor;
- the capacitive sensor comprises at least one electrode provided on at least one of the bezel and the fixed supporting structure and a conductive structure provided on the other of the bezel and the fixed supporting structure, wherein the capacitive sensor generates a signal indicative of the position of the at least one electrode relative to the conductive structure;
- the vehicle light assembly is located on a liftgate of the vehicle;
- the vehicle light assembly is located on an interior surface of the liftgate;
- the vehicle light assembly is located on a trim panel on the liftgate;
- the light assembly illuminates an interior portion of a cargo area of the vehicle when the liftgate is open and is rotatable to illuminate an exterior portion of the vehicle; and
- the lamp comprises a light source and a lens.

These and other aspects, objects, and features of the present invention will be understood and appreciated by those skilled in the art upon studying the following specification, claims, and appended drawings.

DETAILED DESCRIPTION OF THE PREFERRED EMBODIMENTS

Figure 1:
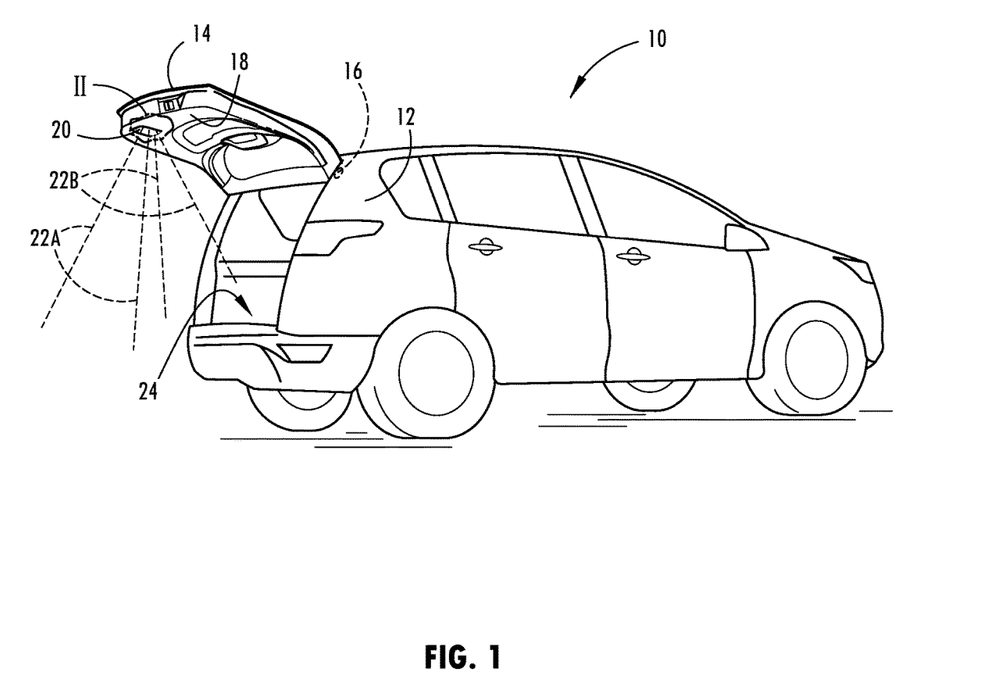
FIG. 1 is a rear perspective view of a vehicle having a liftgate and a rotary lamp assembly for providing light illumination, according to one embodiment.

For purposes of description herein, the terms "upper," "lower," "right," "left," "rear," "front," "vertical," "horizontal," and derivatives thereof shall relate to the invention as oriented in FIG. 1. However, it is to be understood that the invention may assume various alternative orientations, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

Referring to FIG. 1, a wheeled automotive vehicle 10 is generally illustrated having an exterior body 12 and a liftgate 14 at the rear end of the vehicle 10. The liftgate 14 pivots about a hinge assembly 16 in the body 12 to allow the liftgate to move between an open position as shown in FIG. 1 that exposes a rear cargo compartment 24 and a downward closed position that closes off the cargo compartment 24. The liftgate 14 thereby pivots about the hinge assembly 16 on the top end from an approximately vertical orientation in the closed position to an approximately horizontal orientation in the fully open position which is generally positioned above a head of a person standing behind the vehicle when accessing cargo in the cargo compartment 24. The liftgate 14 thereby serves as a door to control ingress and egress of items from the vehicle 10.

Figure 12:
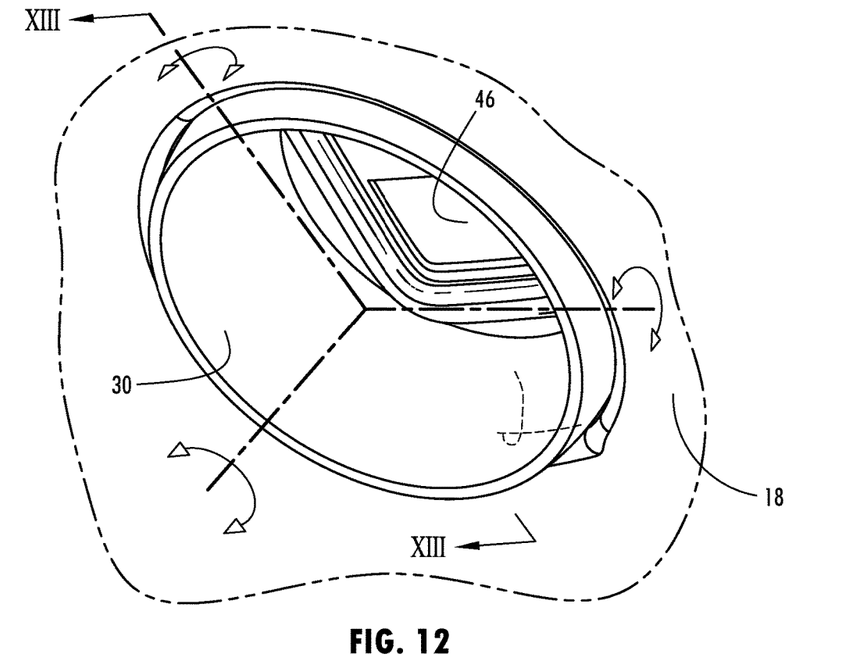
FIG. 12 is an enlarged perspective view of a rotary lamp assembly having multiple axes of rotation, according to a further embodiment.
Figure 13:
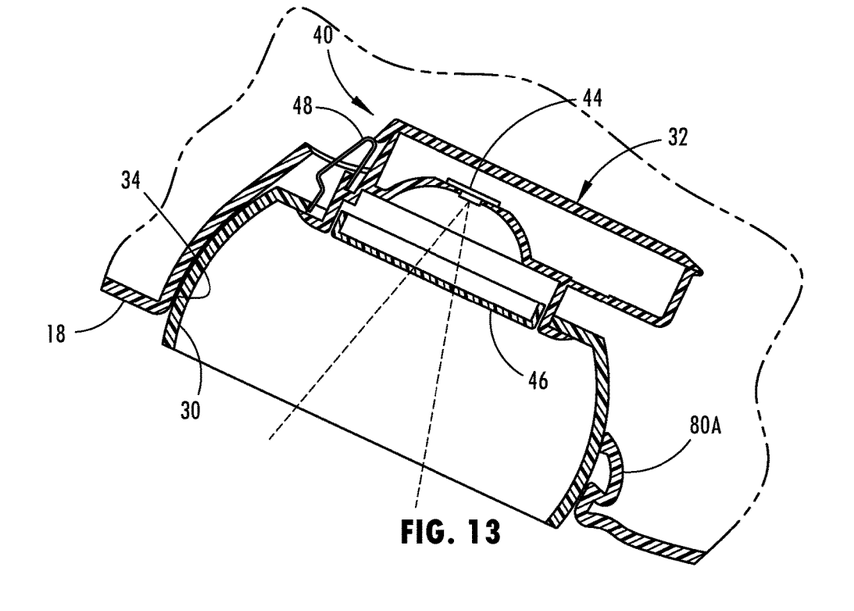
FIG. 13 is a cross-sectional view taken through line XIII-XIII of FIG. 12 with the assembly shown in a middle lighting position.
Figure 13A:
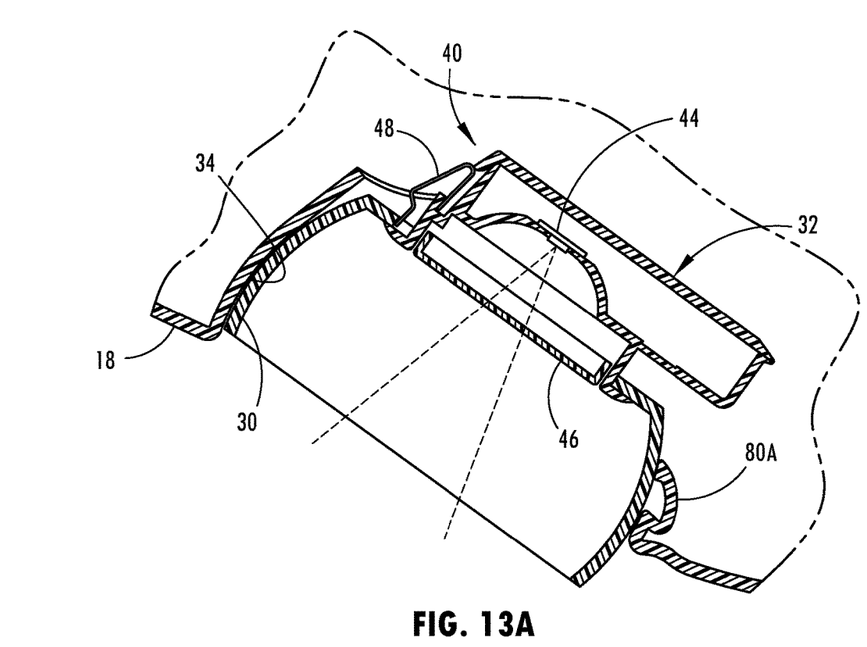
FIG. 13A is a cross-sectional view of the lamp assembly of FIG. 12 taken through line XIII-XIII shown in a rearward lighting position.

Assembled onto the liftgate 14 is a rotary lamp assembly 20 shown assembled within an interior trim panel 18 on the liftgate 14. The rotary lamp assembly 20 generates light illumination generally forward of the trim panel 18. The rotary lamp assembly 20 includes a rotary bezel rotationally coupled to the liftgate 14 and a lamp supported on the bezel. The bezel is rotatable relative to the liftgate 14 about at least one axis to redirect light output from the lamp. As such, the light output shown by light output beam 22A may illuminate an area rearward of the vehicle and the rotary lamp assembly may be rotated forward such that a light beam 22B is illuminating the cargo compartment 24 of vehicle 10. According to one embodiment, the rotary bezel rotates forward and rearward as shown in FIGS. 1-5 when the liftgate 14 is in the open position. According to another embodiment, the rotary lamp assembly 20 employs a rotational position sensor in the form of a capacitive sensor for sensing position of the rotating lamp and controls light illumination based on the sensed position as shown in FIGS. 6-11. According to a further embodiment, the rotary lamp assembly may rotate about multiple axes as shown in FIGS. 12-14 to redirect the light output forward and rearward and left and right.

Referring to FIGS. 2-5, the rotary lamp assembly 20 that rotates between the forward and rearward positions is illustrated according to one embodiment. In this embodiment, the rotary lamp assembly 20 is assembled onto an interior trim panel 18 on the interior surface of the liftgate 14 and is rotatable about a lateral axis of the vehicle 10. As such, light illumination output from the rotary lamp assembly 20 may be redirected between forward and rearward positions when the liftgate is in the open position. In the forward position, the interior storage compartment 24 may be illuminated. In the rearward position, the ground surface rearward of the vehicle 10 may be illuminated. The rotary lamp assembly 20 may be rotated between the forward and rearward positions including any intermediate positions. It should be appreciated that the rotary lamp assembly 20 may illuminate the cargo compartment when the liftgate is in the closed position and may be rotated upward and downward in that position.

The rotary lamp assembly 20 includes a rotary bezel 30 which generally forms a housing having side walls. The rotary bezel 30 has a pair of pivot pins 42 formed on opposite lateral side walls. The pivot pins 42 are assembled into engagement with a pair of matching openings 38 formed in opposite side walls 34 of the trim panel 18. The two pivot pins 42, when engaged in the two openings 38, enable the bezel 30 to rotate about an axis defined by the pins 42. It should be appreciated that one or more pivot pins may be employed to enable the bezel to rotate, such as a single pivot rod.

The rotary lamp assembly 20 also includes a lamp 40 supported on the rotary bezel 30. The lamp 40 is shown including a light source 32 which may include a light emitting diode (LED) 44 on an LED circuit board and a lens 46 positioned forward of the light source 32. The light source 32 may include one or more light sources such as one or more LEDs, incandescent lamps, or other source of light. The lamp 40 may be assembled within an opening 35 in the rear wall of the rotary bezel 30 and connected to the bezel 30 via a bracket 48. As such, the lamp 40 is attached via bracket 48 onto the rotary bezel 30. The bracketed assembly of the rotary bezel 30 and lamp 40 is installed within opening 36 of the trim panel 18 such that the two pivot pins 32 are retained within the two openings 38. The pivot pins 32 may be sized such that there is a sufficient amount of friction or resistance to maintain the assembly 20 in a desired orientation or rotational position. A user may rotate the rotary lamp assembly 20 to redirect the light output by applying force onto the top or bottom sides of the rotary bezel 30.

Figure 2:
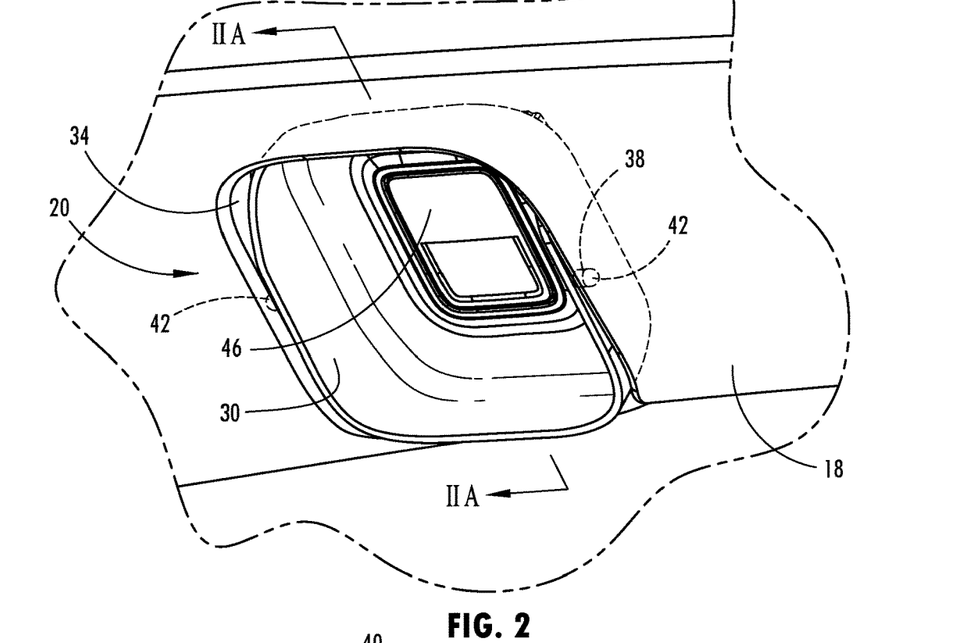
FIG. 2 is an enlarged perspective view of the rotary lamp assembly of FIG. 1 shown in a middle lighting position.
Figure 2A:
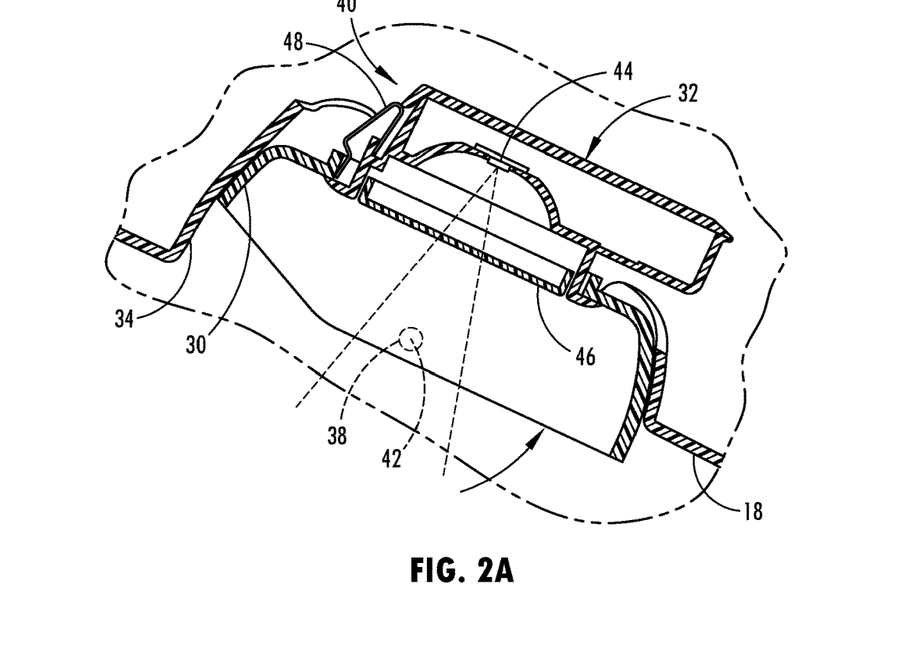
FIG. 2A is a cross-sectional view of the lamp assembly taken through line IIA-IIA of FIG. 2.

As seen in FIGS. 2 and 2A, the rotary lamp assembly 20 may be oriented in a first intermediate position in which the rotary bezel 30 is centrally disposed within the side walls 34 of trim panel 18 and light output is generally directed downward to illuminate a middle area below the liftgate when the liftgate is in the open position.

Figure 3:
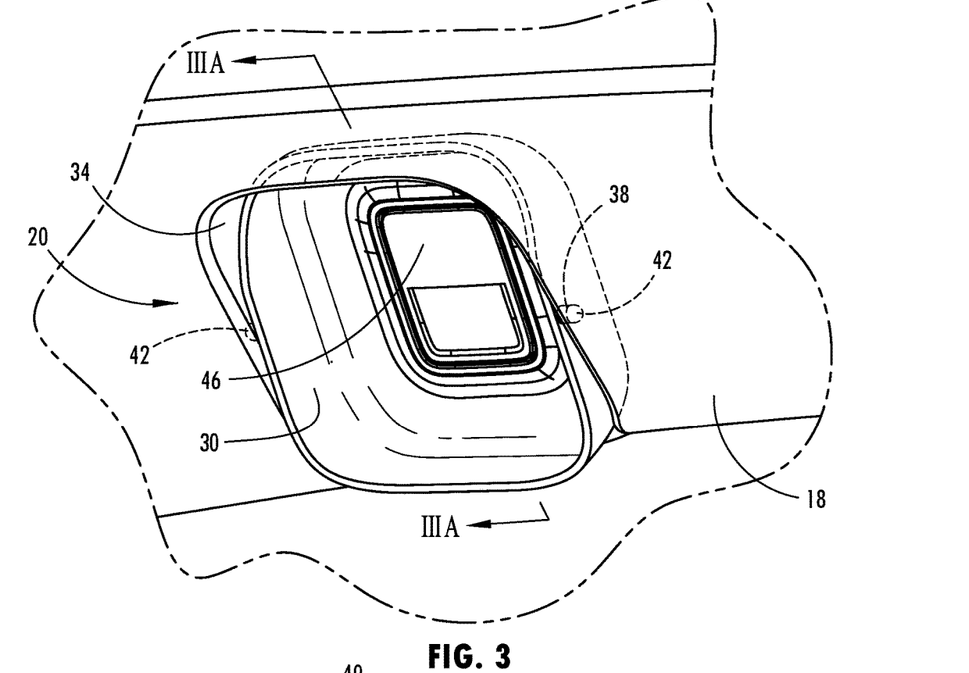
FIG. 3 is an enlarged perspective view of the rotary lamp assembly of FIG. 1 shown in a rearward lighting position.
Figure 3A:
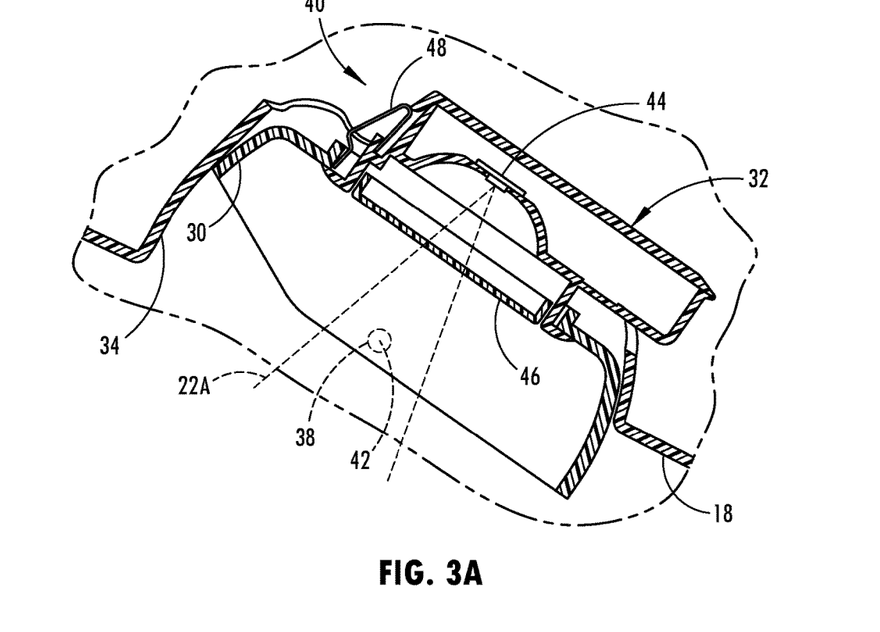
FIG. 3A is a cross-sectional view of the lamp assembly taken through line IIIA-IIIA of FIG. 3.

As shown in FIGS. 3 and 3A, the rotary lamp assembly 20 may be rotated to a rearward illuminating position when a user applies force onto the rearward side of the bezel 30, thereby causing the bezel 30 and the lamp 40 to rotate about pins 32 in a rearward direction so as to direct light rearward of the vehicle.

Figure 4:
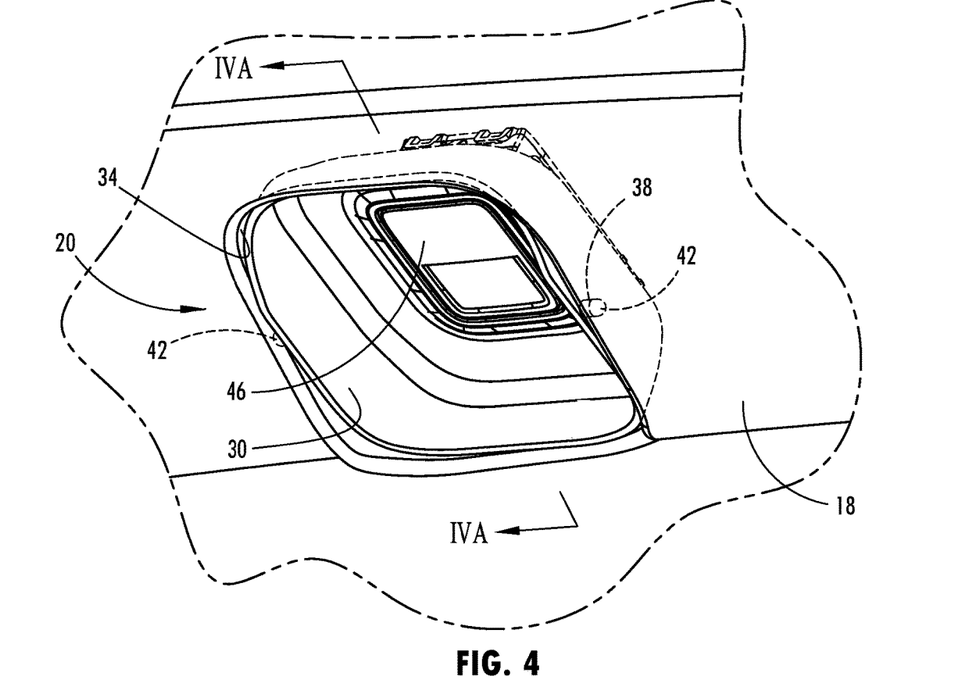
FIG. 4 is an enlarged perspective view of the rotary lamp assembly of FIG. 1 shown in a forward lighting position.
Figure 4A:
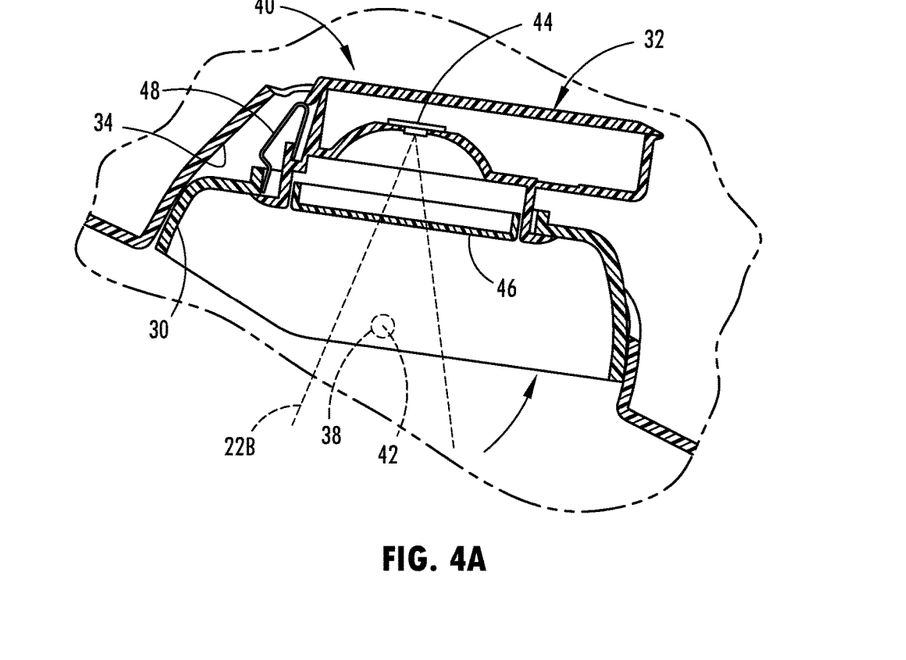
FIG. 4A is a cross-sectional view of the lamp assembly taken through line IVA-IVA of FIG. 4.
Figure 5:
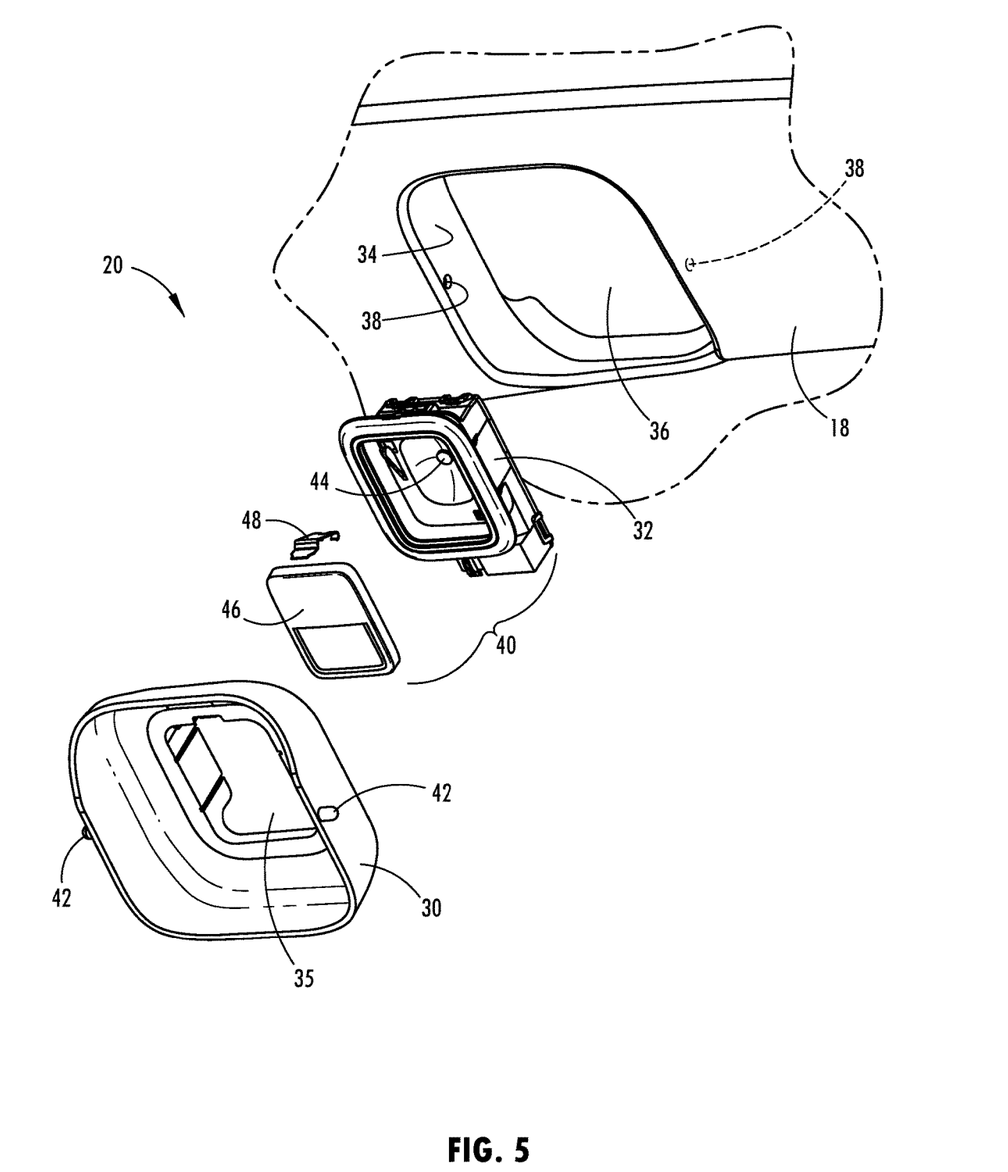
FIG. 5 is an exploded view of the rotary lamp assembly of FIG. 1 exploded from the liftgate.

Referring to FIGS. 4 and 4A, the rotary lamp assembly 20 may be rotated to a forward illumination position in which the light illumination may illuminate the cargo compartment 24 of the vehicle 10. This may be achieved by a user applying force to the forward side of the bezel 30 so as to cause the bezel 30 and lamp 40 to rotate forward. It should be appreciated that a user may actuate the rotary lamp assembly into various other positions intermediate of the forwardmost and rearwardmost positions. It should further be appreciated that an actuator may be employed to automatically rotate the rotary lamp assembly 20 to a desired position.

Figure 6:
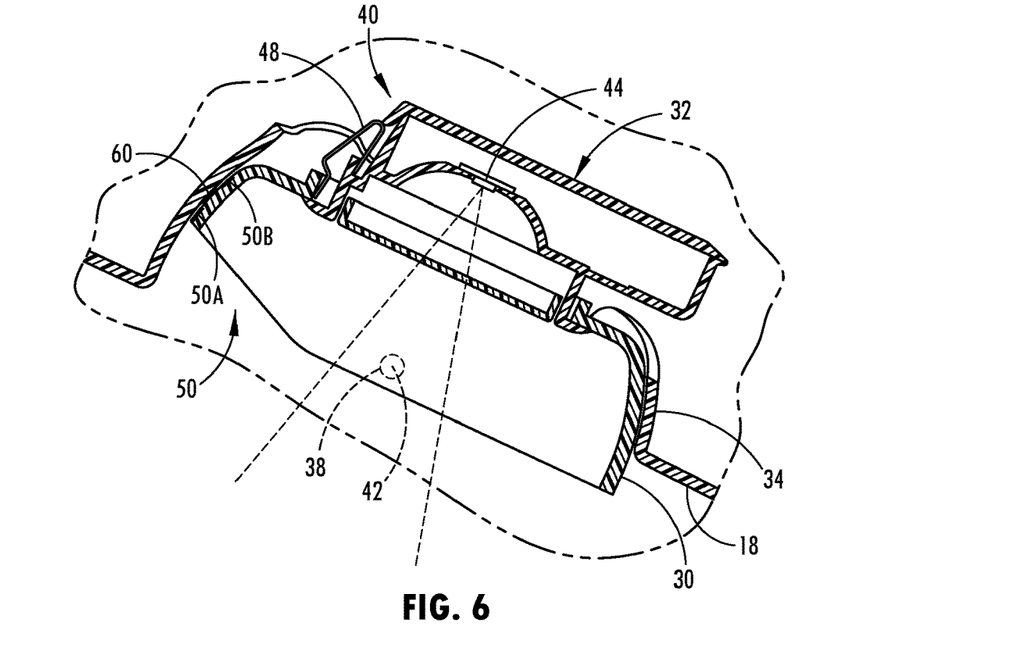
FIG. 6 is a cross-sectional view taken through line IIA-IIA of FIG. 2 further illustrating a capacitive sensor for sensing rotational position of the bezel and lamp in the middle position, according to another embodiment.
Figure 7:
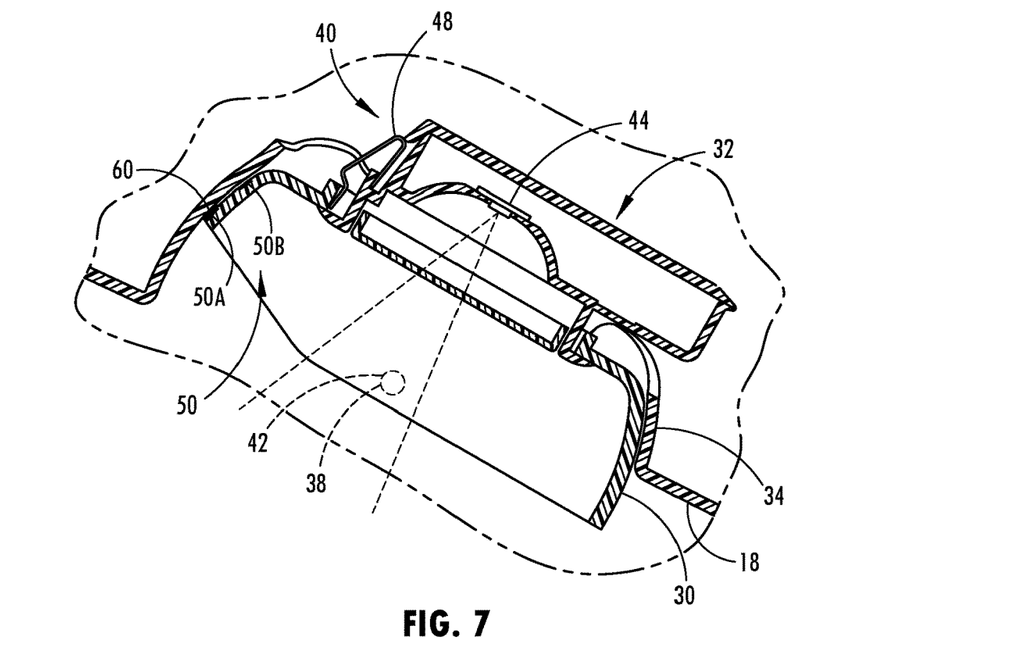
FIG. 7 is a cross-sectional view taken through line IIIA-IIIA of FIG. 3 further illustrating the capacitive sensor sensing the rearward position.
Figure 8:
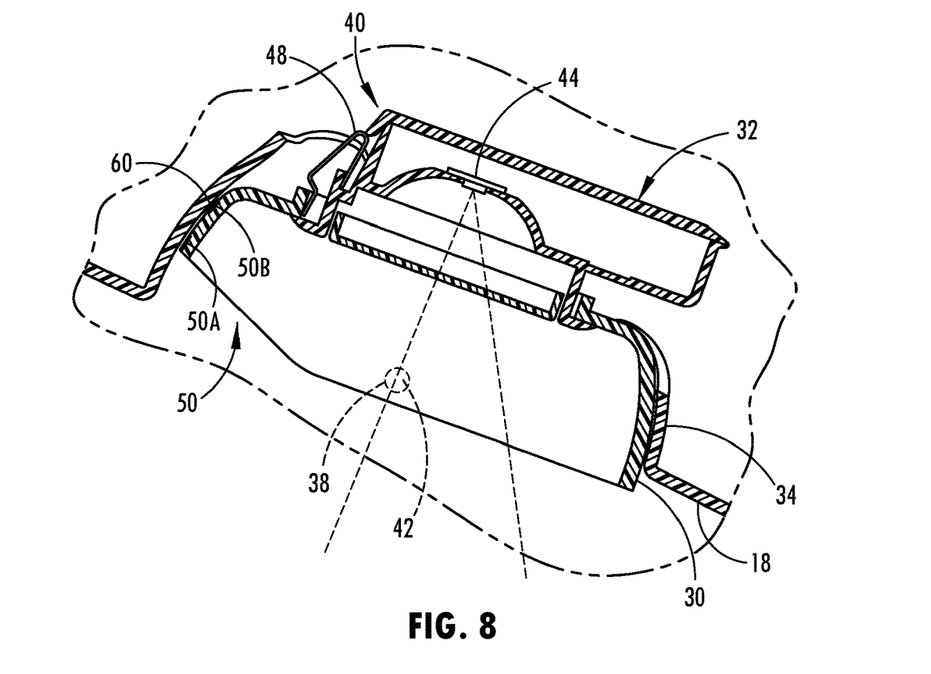
FIG. 8 is a cross-sectional view taken through line IVA-IVA of FIG. 4 further illustrating the capacitive sensor sensing the forward position.

According to another embodiment, the rotary lamp assembly 20 may include a sensor 50 for sensing rotational position of the rotary bezel 30 and a controller for controlling intensity of light emitted by the lamp 40 based on the sensed rotational position of the bezel 30 as shown in FIGS. 6-11. Referring to FIGS. 6-8, the rotary lamp assembly 20 employs a capacitive sensor as the rotational position sensor 50 to sense the rotational position of the rotary lamp assembly 20. The capacitive sensor is shown having capacitive sensor elements 50A and 50B located on an outer surface of the rotary bezel 30 proximate to the side wall 34 of the trim panel 18. Disposed on an inner surface of the side wall 34 of the trim panel 18 is a conductive layer 60. The conductive layer 60 may include a conductive paint or a conductive flex circuit, such as a copper circuit that is adhered onto the side wall 34 via glue. The conductive layer 60 may be electrically grounded according to one embodiment. According to other sensor configurations, the conductive layer 60 may not be grounded. The conductive layer 60 may be sensed by the capacitive sensor 50 to determine the position of the sensor 50 relative to the conductive layer 60. As the bezel 30 rotates relative to the side wall 34 of the trim panel, the capacitive sensor 50 detects the proximate location of the conductive layer 60 relative to the moving capacitive sensor elements 50A and 50B and generates a signal indicative of the rotational position of the rotary bezel 30 relative to the stationary side wall 34 of the trim panel 18.

In the embodiment shown, the conductive layer 60 is located on the side wall 34 of the trim panel 18 and the capacitive sensor 50 comprised of two capacitive sensor elements 50A and 50B are located on an exterior surface of the bezel 30. However, it should be appreciated that the conductive layer 60 may otherwise be located on the bezel 30, such as the outer surface of the bezel 30, and the capacitive sensor 50 may be located on a surface of the side wall 34 of the trim panel 18. The conductive layer 60 causes interference with an activation field generated by each of the capacitive sensor elements 50A and 50B. The activation field associated with each capacitive sensor element 50A and 50B generates a signal which is processed by control circuitry to determine the relative position of the capacitive sensor 50 and the conductive layer 60 so as to determine the relative position of the rotary bezel 30 relative to the fixed side wall of the trim panel 18.

With the rotary lamp assembly 20 in the middle position as shown in FIG. 6, the capacitive sensor elements 50A and 50B are each located at a distance from the conductive layer 60. As the rotary lamp assembly 20 rotates to a rearward position, the capacitive sensor elements 50A and 50B move such that element 50B is further away from conductive layer 60 and element 50A is closer to conductive layer 60. As the bezel and lamp are further rotated to a forwardmost position, the capacitive sensor elements 50A and 50B move such that element 50A is further away from conductive layer 60 and element 50B is closer to the conductive layer 60. The distance between each of the capacitive sensor elements 50A and 50B and the conductive layer 60 is determined by processing the activation fields generated by sensor elements 50A and 50B.

Figure 9:
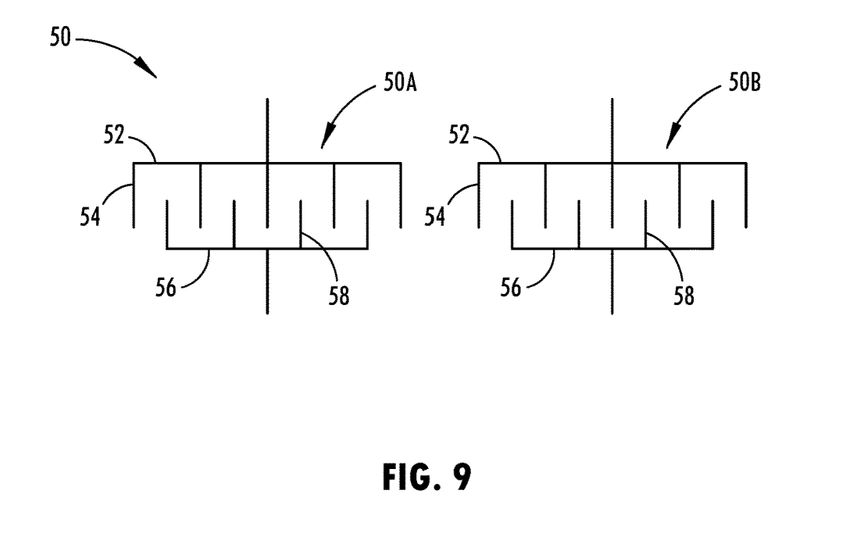
FIG. 9 is a schematic view of a rotary position sensor in the form of two capacitive sensor elements for sensing the rotary position of the bezel and lamp, according to one embodiment.

Referring to FIG. 9, one example of a capacitive sensor 50 with the arrangement of sensor elements 50A and 50B is shown. The capacitive sensor 50 may include first and second capacitive sensor elements 50A and 50B. Each of the capacitive sensor elements 50A and 50B may be formed by printing conductive ink onto a polymeric surface of the bezel 30 to form pairs of electrodes. Each pair of electrodes may include a drive electrode 52 and receive electrode 56 each having interdigitated fingers 54 and 58 for generating a capacitive field. It should be appreciated that each of the proximity sensor elements 50A and 50B may be otherwise formed such as by assembling a preformed conductive circuit trace onto a substrate according to other embodiments. The drive electrode 52 may receive square wave drive pulses applied at a voltage $V_1$. The receive electrode 56 may have an output for generating an output voltage $V_O$. It should be appreciated that the electrodes 52 and 56 may be arranged in various other configurations for generating the capacitive field as the activation field.

The drive electrode 52 of each proximity sensor may be applied with voltage $V_1$ as square wave pulses having a charge pulse cycle sufficient to charge the receive electrode 56 to a desired voltage. The receive electrode 56 thereby serves as a measurement electrode. The adjacent sense activation fields generated by the two proximity sensor elements 50A and 50B may overlap slightly, however, overlap may not exist according to other embodiments. When the conductive layer 60 enters one or both of the activation fields, the proximity sensor elements 50A and 50B detect the disturbance caused by the conductive layer to the activation field and generates a signal which is processed to determine the distance between the conductive layer 60 and the proximity sensor elements 50A and 50B.

While two electrode capacitive sensor elements 50A and 50B are shown, it should further be appreciated that a single electrode capacitive sensor may be employed according to other embodiments. It should further be appreciated that the capacitive sensor 50 may include one or more capacitive sensor elements for sensing rotational position of the bezel and lamp relative to the trim panel. For example, the capacitive sensor 50 may include three capacitive sensor elements.

Figure 10:
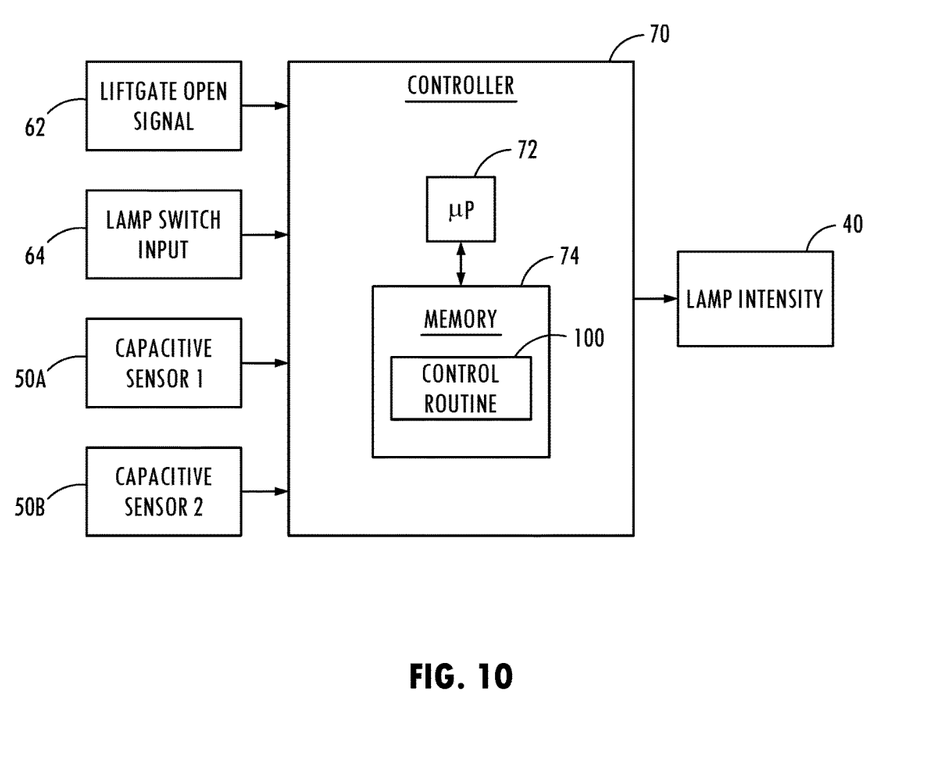
FIG. 10 is a block diagram illustrating the light controls for controlling illumination of the lamp assembly of FIGS. 6-8.

Referring to FIG. 10, a controller 70 is shown processing various inputs and generating outputs to the lamp 40 to adjust the lamp intensity based on the sensed position of the rotary lamp assembly 20. The controller 70 may include control circuitry, such as a microprocessor 72 and memory 74. Stored within memory 74 is a control routine 100 which may be executed by the microprocessor 72 to process the inputs and generate the lamp intensity output. The controller 70 may receive inputs including a liftgate open signal 62 that may turn the lamp 42 on when the liftgate is in the open position, and a lamp switch input which may be a manual activated switch input for turning the lamp 42 on or off. In addition, the controller 70 receives signals from the first capacitive sensor element 50A and the second capacitive sensor element 50B. The controller 70 processes the various inputs according to the control routine 100 and generates the lamp intensity control output signal which is supplied to the lamp 40 to control the light intensity output of lamp 40.

Figure 11:
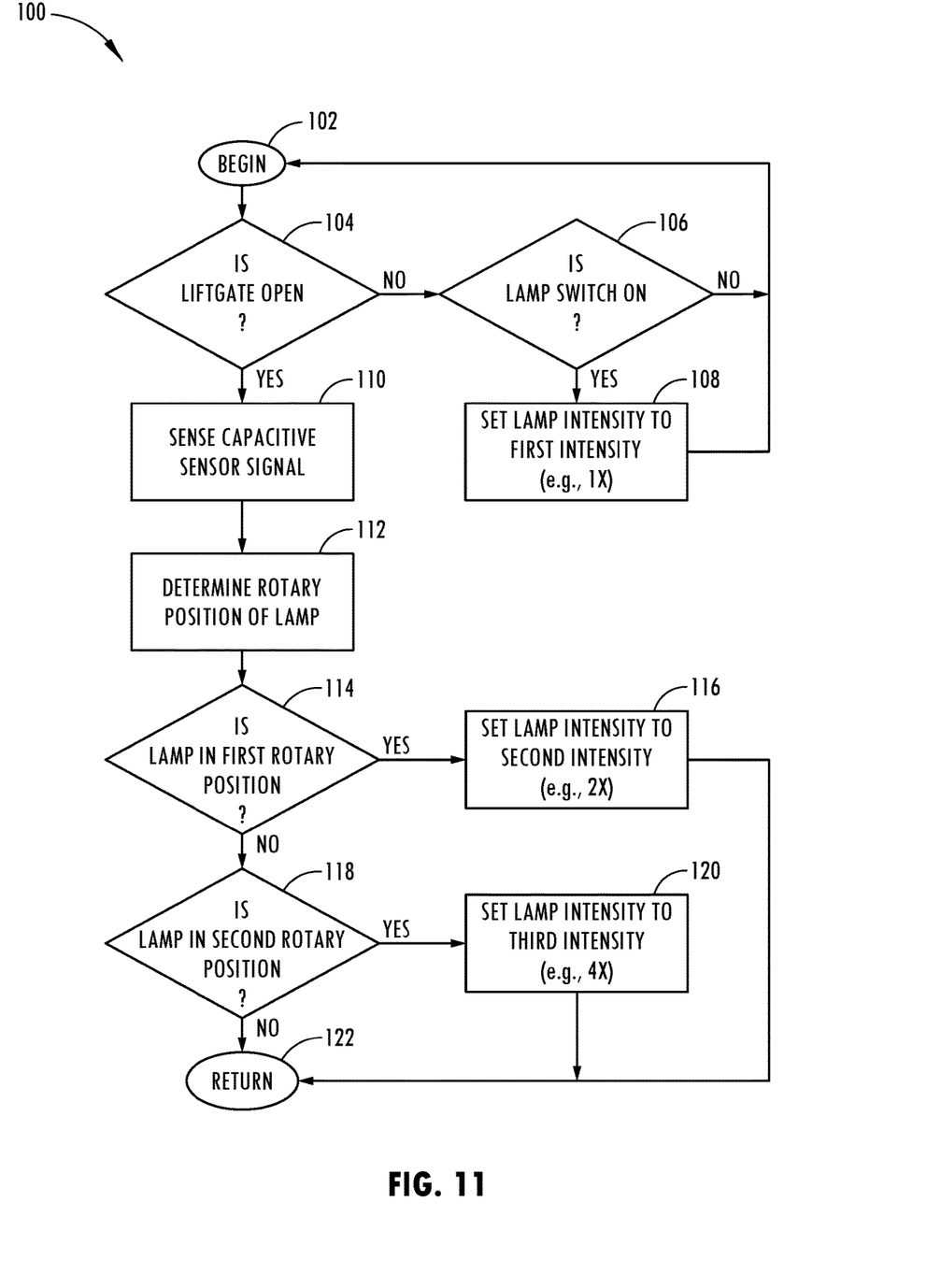
FIG. 11 is a flow diagram illustrating a control routine for controlling illumination of the lamp assembly of FIGS. 6-8 based on the sensed rotary position of the lamp.

Referring to FIG. 11, the control routine 100 for sensing the rotary position of the bezel and lamp assembly and controlling light intensity of the lamp is shown according to one embodiment. Routine 100 begins at step 102 and proceeds to step 104 to determine if the liftgate is in an open position and, if not, proceeds to decision step 106 to determine if the lamp switch is in the on position. If the lamp switch is not on, routine 100 returns to step 102. If the lamp switch is determined to be on, routine 100 proceeds to step 108 to set the lamp intensity to a first intensity, such as a low intensity shown as 1×, before returning to the beginning at step 102.

If the liftgate is determined to be open in decision step 104, routine 100 proceeds to step 110 to sense the capacitive sensor signal and then to step 112 to determine the rotary position of the bezel and lamp assembly. The rotary position of the bezel and lamp assembly may be determined by processing the capacitive signals generated by the first and second capacitive sensor elements due to the disturbance caused by the conductive layer 60 relative to the sensor elements. At decision step 114, routine 100 determines if the lamp is in a first rotary position and, if so, sets the lamp intensity to a second intensity, shown as a higher mid intensity labeled 2×, before returning at step 122. If the lamp is not in the first rotary position, routine 100 proceeds to decision step 118 to determine if the lamp is in a second rotary position and, if so, sets the lamp intensity to a third higher intensity, shown as high intensity 4×, before returning to step 122. Otherwise, routine 100 proceeds to step 122 to return. The first rotary position may be the forward position for illuminating the cargo compartment and the second rotary position may be the rearward position for illuminating the ground rearward of the vehicle when the liftgate is in the open position.

Referring to FIGS. 12-14, a rotary lamp assembly 20 is illustrated according a further embodiment with the ability to rotate about multiple axes of rotation. In this embodiment, the rotary lamp assembly 20 may rotate about a lateral axis of the vehicle between forward and rearward positions as described in the embodiment above, and may also rotate about a vertical axis to direct light output toward left and right lateral sides of the vehicle. The rotary lamp assembly 20 includes a lamp 40 having the same or similar light source 42 with LED 44, lens 46 and bracket 48 for attachment onto a bezel 30. The bezel 30 has a generally spherical-shaped portion forming the side wall that is assembled into a generally spherical-shaped opening 36 within the trim panel 18. The generally spherical opening 36 within trim panel 18 is slightly larger than the spherical-shaped portion of the side wall of the bezel 30 such that the bezel 30 with the assembled lamp 40 may rotate both about the lateral and vertical axes.

The trim panel 18 is shown having a plurality of retention members shown as three retention members 80A, 80B and 80C. The retention members 80A-80C are formed on the interior surface of the side wall 34 forming the opening 36 in the trim panel 18 at equal distances apart from one another such that each retention member 80A-80C is about one hundred twenty degrees (120°) apart from the adjacent retention features. The retention features 80A-80C extends inward within the opening 36 in the side wall 34 so as to engage the generally spherical surface portion of the bezel 30 when inserted within opening 36. The retention features 80A-80C are positioned so as to engage bezel 30 in an overcenter position that retains bezel 30 within opening 36 and allows movement of bezel 30 about the lateral and vertical axes relative to the trim panel 18. Each of the retention features 80A-80C is shown having a generally bent spring-biased arm for engaging the surface of the bezel 30. It should be appreciated that the bezel 30 may be easily inserted within opening 36 and that the retention elements 80A-80C may be spring-biased to receive and hold the bezel 30 in position and to allow the bezel 30 to rotate about multiple axes.

Figure 13B:
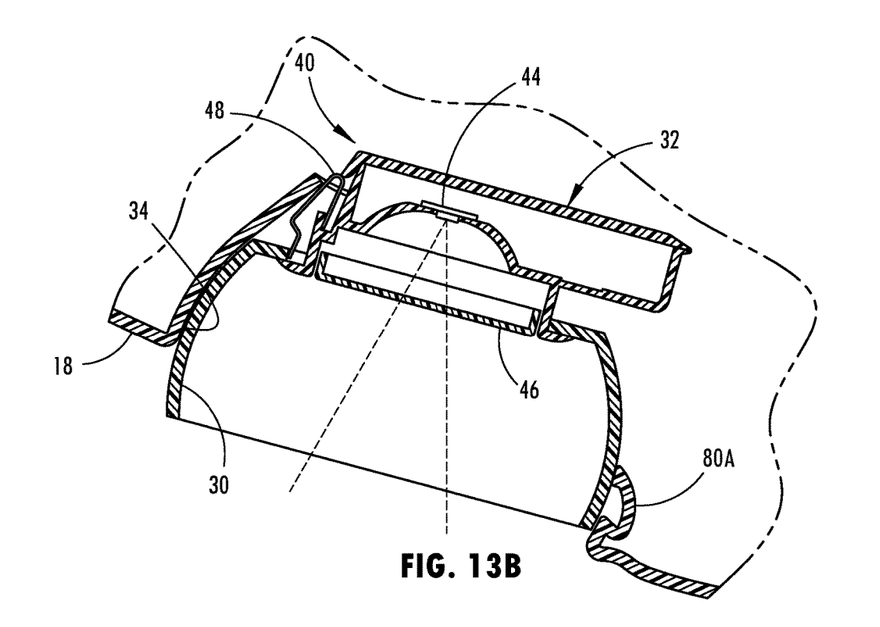
FIG. 13B is a cross-sectional view of the lamp assembly of FIG. 12 taken through line XIII-XIII shown in a forward lighting position.
Figure 14:
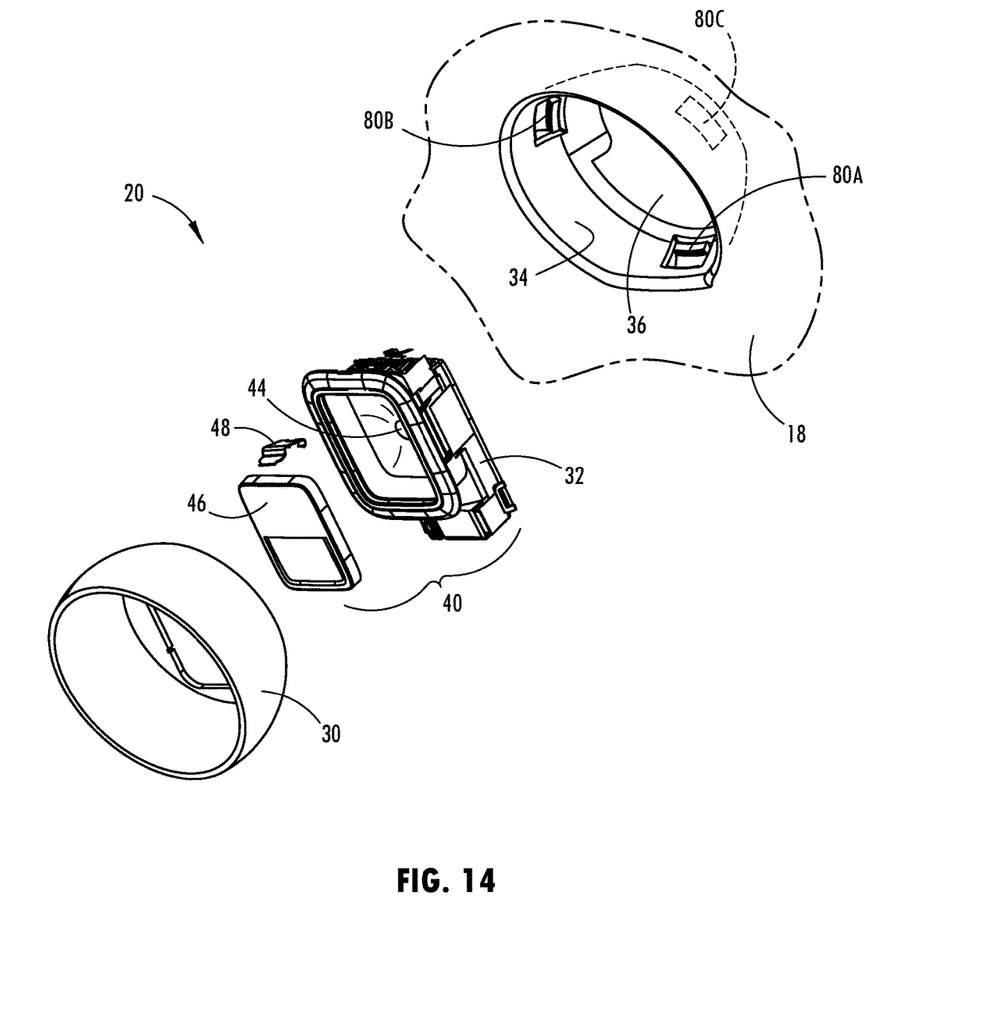
FIG. 14 is an exploded view of the rotary lamp assembly of FIG. 12 exploded from the liftgate.

The generally spherical bezel 30 may rotate amongst a plurality of positions as shown in FIGS. 13-13B. As seen in FIG. 13, the lamp assembly 20 is positioned with the bezel 30 in a generally middle position to illuminate the ground generally directly below the liftgate when in the open position. The bezel 30 may move forward and rearward and also left and right to lateral sides of the vehicle to provide a beam of light illumination to a desired area simply by allowing an operator to push on the bezel 30 with force to move the bezel into a desired direction. The bezel 30 may be moved to a rearward position as shown in FIG. 13A to direct a beam of light rearward of the vehicle. The bezel 30 may also be moved to a forward position as shown in FIG. 13B to illuminate forward into the cargo area of the vehicle. In addition, the bezel 30 may be rotated to the left side or to the right side to illuminate the left side of the cargo compartment or the right side of the cargo compartment or an area rearward of the vehicle to the right or left or to the sides below the vehicle liftgate. It should further be appreciated that the intensity of the light may be controlled based on a sensed position of the bezel as described above.

Accordingly, the rotary lamp assembly advantageously allows for rotational redirectivity of the light illumination on a liftgate of a vehicle. This advantageously allows for light to be redirected between a forward position to illuminate the rear storage compartment and a rearward position to illuminate an area rearward of the vehicle. Additionally, the rotary lamp assembly may advantageously be adjusted in intensity based on the rotational position of the assembly such that greater light intensity may be directed in a position such as a rearward position as opposed to the forward position. Further, the rotary lamp assembly 20 may be configured to rotate about a plurality of axes of rotation such that the lamp may rotate between forward and rearward positions and also lateral side positions. The lamp assembly therefore provides for enhanced light illumination on a liftgate of a vehicle.

It is to be understood that variations and modifications can be made on the aforementioned structure without departing from the concepts of the present invention, and further it is to be understood that such concepts are intended to be covered by the following claims unless these claims by their language expressly state otherwise.

What is claimed is:

1. A light assembly comprising:
   a lamp;
   a rotary bezel supporting the lamp;
   a capacitive sensor comprising at least one electrode movable relative to a conductive structure during rotation of the bezel for sensing rotational position of the bezel; and
   a controller for controlling intensity of light emitted by the lamp based on the sensed rotational position of the bezel.

2. The light assembly of claim 1, wherein the capacitive sensor senses the rotational position of the bezel relative to a fixed supporting structure.

3. The light assembly of claim 2, wherein the capacitive sensor comprises the at least one electrode provided on at least one of the bezel and the fixed supporting structure and the conductive structure provided on the other of the bezel and the fixed supporting structure, wherein the capacitive sensor generates a signal indicative of the position of the at least one electrode relative to the conductive structure.

4. The light assembly of claim 1, wherein the light assembly is assembled on a vehicle.

5. The light assembly of claim 4, wherein the light assembly is located on a liftgate of the vehicle.

6. The light assembly of claim 5, wherein the light assembly is located on an interior surface of the liftgate.

7. The light assembly of claim 6, wherein the light assembly is located on a trim panel on the liftgate.

8. The light assembly of claim 5, wherein the light assembly illuminates an interior portion of a cargo area of the vehicle when the liftgate is open and is rotatable to illuminate an exterior portion of the vehicle.

9. The light assembly of claim 1, wherein the lamp comprises a light source and a lens.

10. A vehicle light assembly comprising:
a lamp;
a rotary bezel assembled on an interior surface of a liftgate on a vehicle and fixedly supporting the lamp oriented to illuminate a cargo area when the liftgate is closed;
a sensor for sensing rotational position of the bezel, wherein the sensor comprises a proximity sensor for sensing the rotational position of the bezel relative to a fixed supporting structure of the vehicle, wherein the proximity sensor comprises a capacitive sensor, and wherein the capacitive sensor comprises at least one electrode provided on at least one of the bezel and the fixed supporting structure and a conductive structure provided on the other of the bezel and the fixed supporting structure, wherein the capacitive sensor generates a signal indicative of the position of the at least one electrode relative to the conductive structure; and
a controller for controlling intensity of light emitted by the lamp based on the sensed rotational position of the bezel when the liftgate is open.

11. The vehicle light assembly of claim 10, wherein the vehicle light assembly is located on a trim panel on the liftgate.

12. The vehicle light assembly of claim 10, wherein the vehicle light assembly illuminates an interior portion of the cargo area of the vehicle at a first intensity when the liftgate is open and is rotatable to illuminate an exterior portion of the vehicle at a second intensity.

13. The vehicle light assembly of claim 10, wherein the lamp comprises a light source and a lens.

14. A vehicle light assembly comprising:
a lamp;
a rotary bezel assembled on an interior surface of a litigate on a vehicle and fixedly supporting the lamp oriented to illuminate a cargo area when the liftgate is closed;
a sensor for sensing rotational position of the bezel; and
a controller for controlling intensity of light emitted by the lamp based on the sensed rotational position of the bezel when the liftgate is open, wherein the sensor comprises a capacitive sensor comprising at least one electrode movable relative to a conductive structure during rotation of the bezel.

* * * * *

UNITED STATES PATENT AND TRADEMARK OFFICE
CERTIFICATE OF CORRECTION

PATENT NO. : 10,011,223 B1
APPLICATION NO. : 15/494855
DATED : July 3, 2018
INVENTOR(S) : Salter et al.

Page 1 of 1

It is certified that error appears in the above-identified patent and that said Letters Patent is hereby corrected as shown below:

Column 10:
Claim 14, Line 19;
"litigate" should be --liftgate--.

Signed and Sealed this
Eighteenth Day of September, 2018

Andrei Iancu
*Director of the United States Patent and Trademark Office*